(12) United States Patent
Caruso et al.

(10) Patent No.: US 6,548,914 B1
(45) Date of Patent: Apr. 15, 2003

(54) CRUSH SPACE CRASH SENSOR FOR MOTOR VEHICLE OCCUPANT RESTRAINT DEPLOYMENT CONTROL

(75) Inventors: Christopher Michael Caruso, Kokomo, IN (US); Brian Scott Kvapil, Janesville, WI (US); Shyam V. Potti, Carmel, IN (US); Lee Charles Boger, Noblesville, IN (US); James Hill Brogoitti, Oro (MX); Hector Daniel Martinez, Oro (MX)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 09/688,586

(22) Filed: Oct. 16, 2000

(51) Int. Cl.[7] .............................................. B60R 22/00
(52) U.S. Cl. ...................................... 307/10.1; 307/9.1
(58) Field of Search ................................. 307/10.1, 9.1

(56) References Cited

U.S. PATENT DOCUMENTS 5,504,379 A * 4/1996 Mazur et al. ............... 307/10.1
6,236,308 B1 * 5/2001 Dalum ........................ 340/436
6,363,308 B1 * 3/2002 Caruso et al. ................. 701/45

* cited by examiner

Primary Examiner—Brian Sircus
Assistant Examiner—Robert L. DeBeradinis
(74) Attorney, Agent, or Firm—Robert M. Sigler

(57) ABSTRACT

A satellite crash sensor for use in a noisy area such as a crush zone has a crash dependent clock that uses an accumulated velocity signal derived from the acceleration signal, rather than the acceleration signal itself, to determine initiation and counting of the clock count. Successive velocity values are accumulated in an accumulated velocity value that is limited between zero and a maximum limit value. The clock count is incremented away from an initial zero value when the accumulated velocity value is greater than zero and back toward the zero value when the accumulated velocity value is equal to zero. The clock count is used as a measure of time from initiation of a possible crash event in the generation of a restraint deploy indicating signal in the satellite crash sensor.

4 Claims, 5 Drawing Sheets

CRUSH SPACE CRASH SENSOR FOR MOTOR VEHICLE OCCUPANT RESTRAINT DEPLOYMENT CONTROL

TECHNICAL FIELD

The technical field of this invention is the deployment of an occupant restraint in a motor vehicle during a vehicle crash event.

BACKGROUND OF THE INVENTION

Occupant restraint deployment controls have developed greatly, in sophistication, capability and complexity, and perform admirably at distinguishing deploy from non-deploy events. This is often achieved with the use of a "smart" crash sensor, consisting of an accelerometer with very sophisticated signal processing and logic, in the passenger area of a vehicle, supplemented by one or more simpler satellite crash sensors in other locations providing additional information to the process. But the process of improvement is by no means over, and further sophistication of the controls continues.

One of the satellite sensors for such systems is located in a "crush zone" of the vehicle, where it provides an earlier look at the accelerations produced by a crash event. New, more sophisticated controls are making more use of the output of such "crush zone" satellite sensors for use in crash severity measures required for multiple stage restraint deployment. The satellite sensors themselves are therefore becoming "smart", with their own sophisticated processing and logic including time dependent thresholds and other features requiring the use of a crash dependent software "clock" that provides a dependable indication of time from the initiation of a possible crash event.

The use of a crash dependent clock with a time dependent threshold is illustrated in the curves of FIG. 5, which shows an acceleration signal 4 derived from a crash sensor accelerometer in a possible crash event as a function of time. Superimposed on the curve is a time dependent threshold to which the acceleration signal is to be compared: if the acceleration signal exceeds the threshold prior to a predetermined desired trigger time DTT, a true crash event is indicated. But this threshold is shown as two separate curves, identical in shape but shifted in time: curve 6 is initiated earlier in time than curve 8. The result of this is that the same measure 4 produces a positive crash indication when compared with later initiated threshold curve 8 but does not when compared with the earlier initiated threshold curve 6. Since the generation and timing of the threshold curve is controlled by the crash dependent clock, the operation of that clock is crucial.

The simplest prior art embodiment of a crash dependent clock of the prior art is a software clock variable set to an initial value such as zero and incremented beginning when the acceleration signal exceeds a first predetermined level, typically about 1.5 to 2 g's, that is higher than any produced by hard braking. The variable continues to be incremented, once each program loop, but is reset if a predetermined number of loops produce acceleration values than a second predetermined level that may be the same as the first or lower for hysteresis.

More sophisticated crash clocks provide for multiple event scenarios wherein the vehicle hits a curb or pothole just before hitting a tree or light pole. Simple crash dependent clocks may combine the initial, non-crash event and the later, true crash event into one long event, with early initiation of a time dependent threshold preventing this threshold from correctly identifying the true crash event. Crash dependent clock algorithms thus now provide for temporarily holding or counting the variable backward to control the time dependent threshold in a more sophisticated manner for more accuracy in complex scenarios.

But there is an additional problem with the use of crash dependent clocks in a "crush zone" of the vehicle. Such an area is close to the actual point of impact and contains significant structure undergoing deformation: it thus tends to be very noisy, in terms of accelerations; and this makes it difficult to pick out a clean acceleration signal for accurate control of a crash dependent clock.

SUMMARY OF THE INVENTION

The crash sensor of this invention overcomes noisy vehicle acceleration signals from areas such as a crush zone to provide a crash dependent clock by using a velocity signal derived from the acceleration signal, rather than the acceleration signal itself, to determine initiation and counting of the clock variable. Crash velocity provides a cleaner signal in the crush zone for crash dependent clock determination.

The sensor of this invention is a satellite crash sensor for a motor vehicle occupant restraint system containing an accelerometer for providing an acceleration signal, means for initiating a clock count at an initial clock value, means for sampling the acceleration signal and deriving a velocity value therefrom and means for accumulating successive ones of the velocity values in an accumulated velocity value and limiting the accumulated velocity value between a minimum limit value and a maximum limit value. It further has means for incrementing the clock count in a first direction from the initial clock value when the accumulated velocity value is not equal to the minimum limit value and in an opposite direction toward the initial clock count when the accumulated velocity value is equal to the minimum limit value. Finally, it has means for using the clock count as a measure of time from initiation of a possible crash event in the generation of a restraint deploy indicating signal in the satellite crash sensor.

DESCRIPTION OF THE PREFERRED EMBODIMENT

Figure 1:
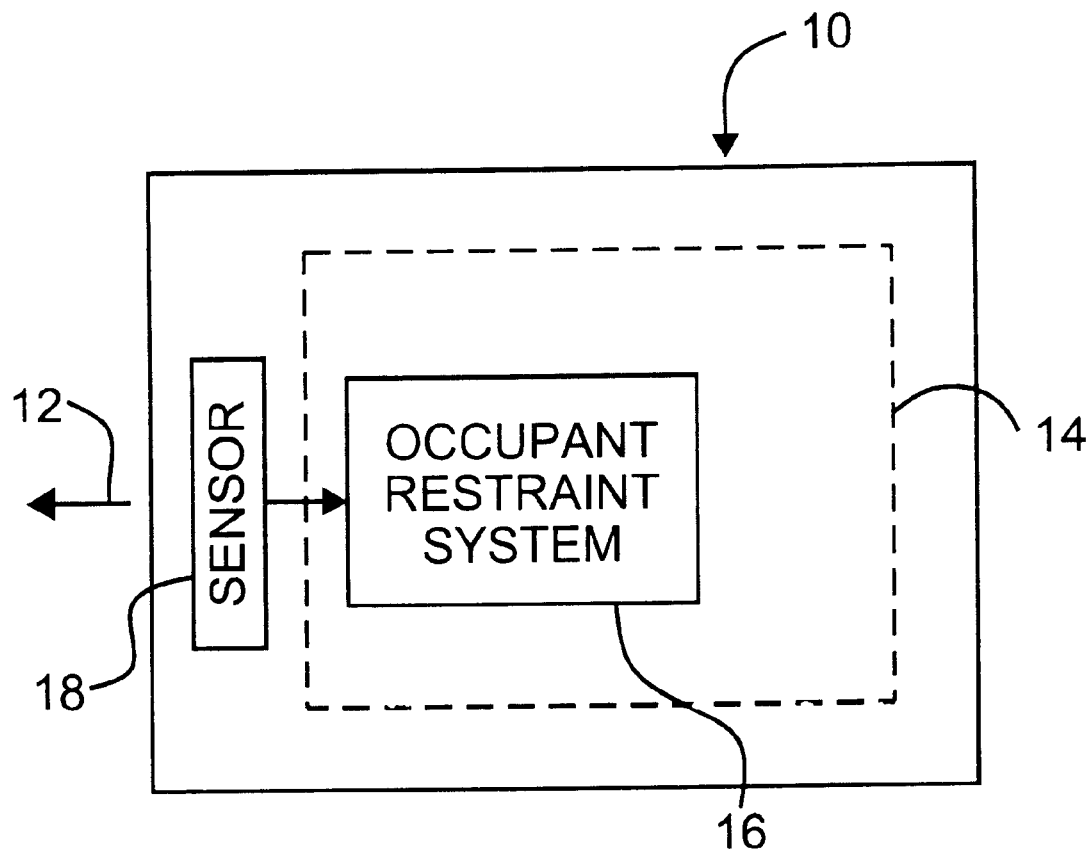
FIG. 1 shows a block diagram of a vehicle having an occupant restraint system including a crash sensor according to the invention.

Referring to FIG. 1, a motor vehicle 10 has front end indicated by directional arrow 12 and a passenger zone 14 provided with an occupant restraint system 16. Occupant restraint system 16 is preferably provided with a main accelerometer to provide a signal of vehicle acceleration and a microcomputer programmed to process and derive various vehicle dynamic measures from the accelerometer signal and compare the measures with thresholds in a timed manner to detect a vehicle crash and deploy one or more occupant restraints. Occupant restraint system 16 is assisted in this task by a satellite sensor 18 located in a crush zone 20, in this embodiment a frontal crush zone, that provides a crash signal to occupant restraint system 16.

Figure 2:
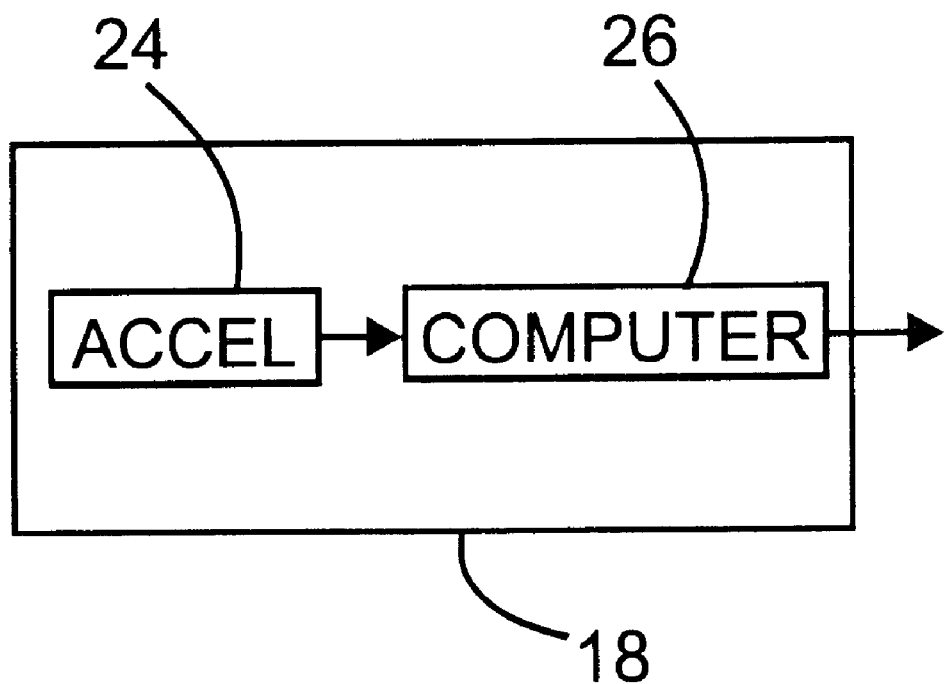
FIG. 2 shows a block diagram of a satellite sensor according to the invention for use in the occupant restraint system of FIG. 1.

FIG. 2 shows a block diagram of satellite sensor 18. An accelerometer 24 is positioned to detect longitudinal accelerations of the vehicle and provide an output signal to a microcomputer 26, which processes the signals and provides an output crash signal for the compute in the occupant restraint system 16.

Figure 3A:
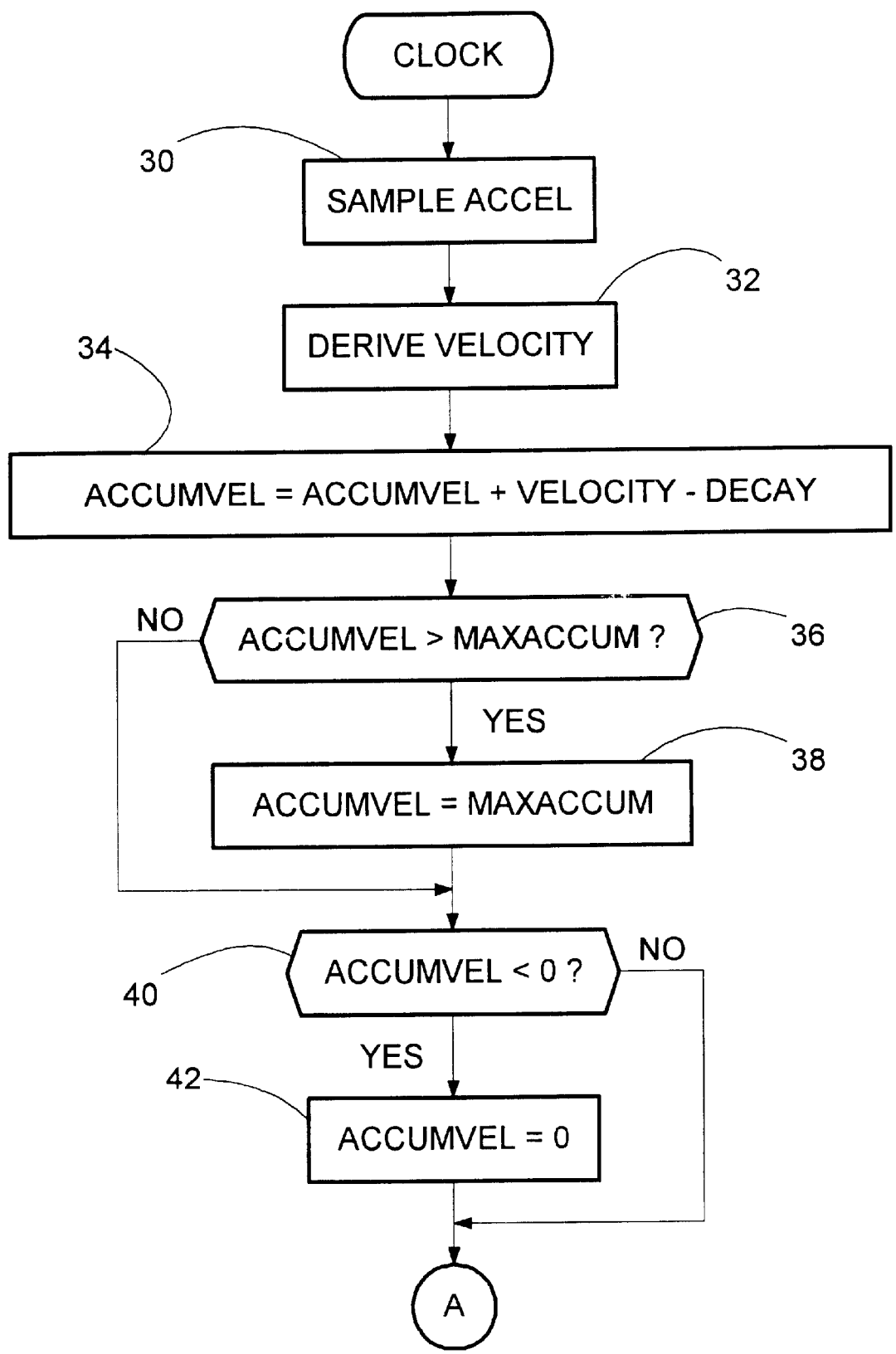
FIGS. 3A and 3B show a flow chart illustrating the operation of the crash sensor of FIG. 2.
Figure 3B:
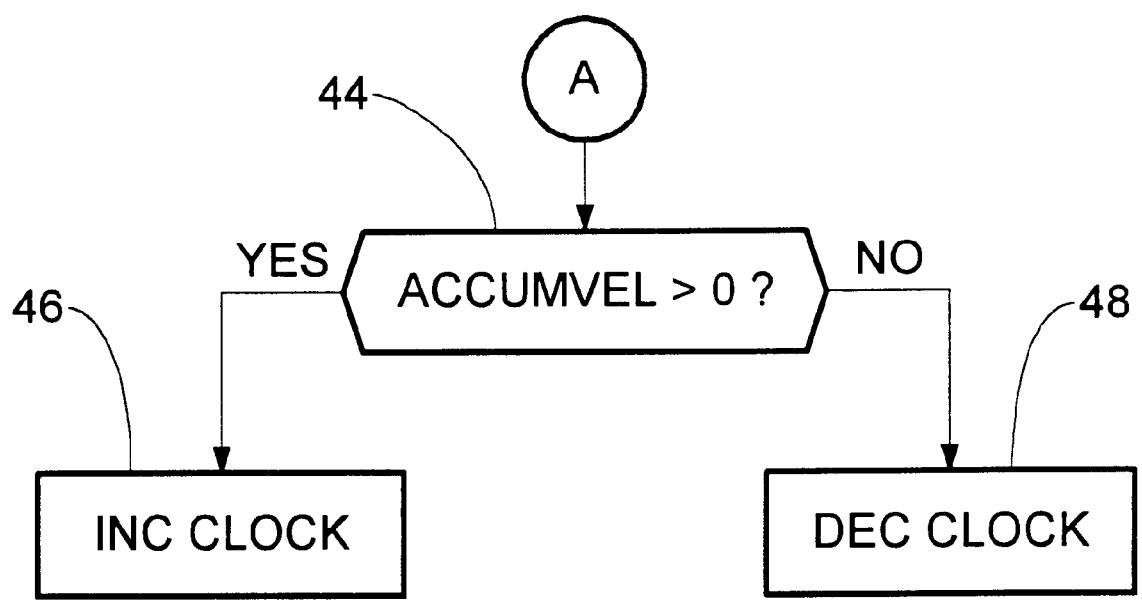

Referring to FIGS. 3A and 3B, subroutine CLOCK begins at step 30 of FIG. 3A by low pass filtering and sampling the acceleration signal from accelerometer 24 in satellite sensor 18 to provide an acceleration signal ACCEL. Positive values of acceleration are defined as those producing a reduction in velocity. It next derives a VELOCITY signal at step 32, for example by integrating acceleration signal ACCEL. The subroutine maintains a value ACCUMVEL in memory for accumulating consecutive values of VELOCITY. This value is initiated at zero; and at step 34 it is increased or decreased by the latest value of VELOCITY, depending on the sign of VELOCITY and decreased by a decay value DECAY. The sum ACCUMVEL is limited between zero and a maximum value MAXACCUM in the next four steps. In step 36 ACCUMVEL is compared with upper limit MAXACCUM. If it is greater, it is set equal to MAXACCUM in step 38. If not, step 38 is skipped. In step 40, ACCUMVEL is compared with the lower limit zero. If it is less, it is set equal to zero in step 42. If not, step 42 is skipped.

The flow chart continues in FIG. 3B. ACCUMVEL is compared with zero in step 44. If it is greater than zero, CLOCK is incremented in step 46. If it is not greater than zero, it must be equal to zero, since it was just limited to that value. In this case, CLOCK is decremented (incremented negatively). Thus, the value of CLOCK is increases at a steady rate as long as the accumulated value of VELOCITY is positive and non-zero but decreases at a steady rate, limited to zero, when the accumulated value of VELOCITY is zero.

Figure 5:
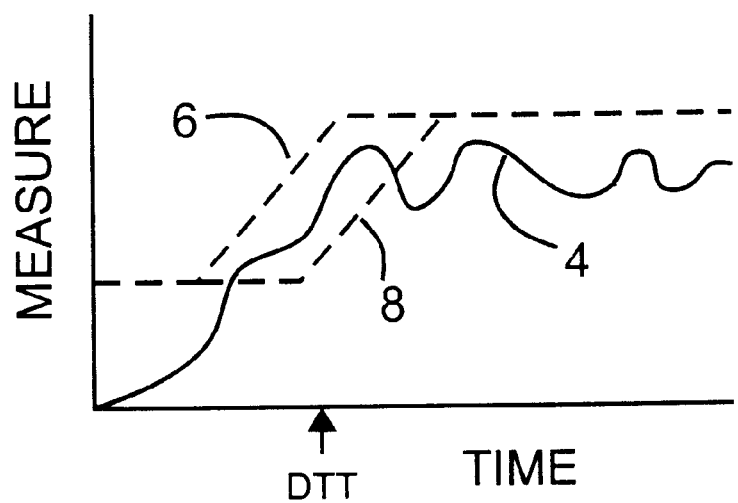
FIG. 5 shows a set of curves showing a crash severity measure compared with two time dependent thresholds as a function of time.
Figure 4:
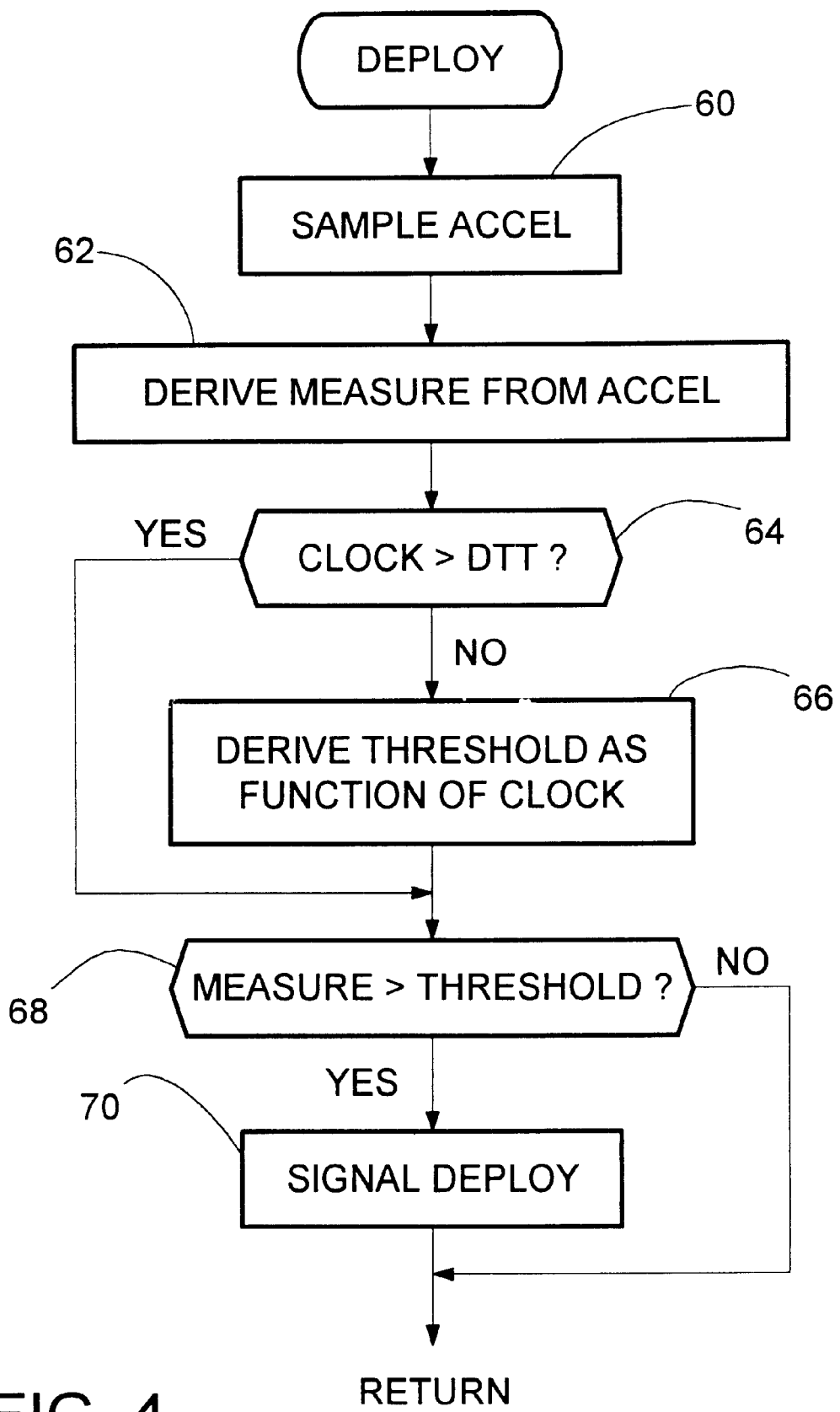
FIG. 4 shows a flow chart further illustrating the operation of the crash sensor of FIG. 2.

The use of CLOCK is illustrated by the example flow chart of FIG. 4, which provides a flow chart of an example of a general crash severity measure using a crash determined clock with a time dependent threshold such as shown by curve 6 or curve 8 of FIG. 5. Referring to FIG. 4, subroutine DEPLOY starts at step 60 by sampling or reading the acceleration value ACCEL. In step 62, a crash severity measure MEASURE is derived from sampled acceleration ACCEL and any other required values. The particular measure is unimportant, except that it is one conveying important information when compared to a properly initiated time dependent threshold. In step 64, the value of CLOCK is compared with a stored value of DTT, the desired trigger time for deployment of the occupant restraint. If it is greater, the subroutine is exited, since it is too late for deployment. If not, a threshold value THRESHOLD is read in step 66 from values stored in memory or derived in an equation as a function of the value of CLOCK, as determined above, which value is an estimate of the true time from the initiation of a possible crash event. In step 68, the value MEASURE is compared to THRESHOLD. If it is greater, a deployment indication signal DEPLOY is generated in step 70; and the subroutine is exited. If it is not, the subroutine is exited without executing step 70. Signal DEPLOY does not necessarily have to actually cause deployment of a restraint. Depending on the total algorithm or program of crash sensor 18, signal DEPLOY may be an output deployment indicating signal from sensor 18 passed to the computer in the occupant restraint system 16 or just one step in the possible generation of such a signal. In addition, even if occupant restraint system 16 receives such a signal from satellite crash sensor 18, it may or may not cause actual restraint deployment, depending on the algorithm or program of the computer therein and/or signals from the accelerometer therein and other satellite sensors reporting thereto. But, whatever the case, the weight given to this signal can be greater because of its use of the velocity signal in controlling its crash dependent clock.

What is claimed is:

1. A satellite crash sensor for a motor vehicle occupant restraint system, the sensor comprising:

an accelerometer for providing an acceleration signal;

means for initiating a clock count at an initial clock value;

means for sampling the acceleration signal and deriving a velocity value therefrom;

means for accumulating successive ones of the velocity values in an accumulated velocity value and limiting the accumulated velocity value between a minimum limit value and a maximum limit value;

means for incrementing the clock count in a first direction from the initial clock value when the accumulated velocity value is not equal to the minimum limit value and in an opposite direction toward the initial clock count when the accumulated velocity value is equal to the minimum limit value; and means for using the clock count as a measure of time from initiation of a possible crash event in the generation of a restraint deploy indicating signal in the satellite crash sensor.

2. The sensor of claim 1 in which the means for accumulating further comprises means for providing a periodic decay of the accumulated velocity value toward the minimum limit value.

3. The sensor of claim 1 in which the means for using the clock count comprises means for comparing a measure signal derived from the acceleration signal to a threshold stored as a function of time from initiation of a possible crash event as indicated by the clock count and generating a deploy signal if the measure signal exceeds the threshold.

4. The sensor of claim 1 further comprising means for low pass filtering the acceleration signal prior to the sampling thereof.

* * * * *